United States Patent [19]

Corsmeier et al.

[11] Patent Number: 4,953,282
[45] Date of Patent: Sep. 4, 1990

[54] STATOR VANE MOUNTING METHOD AND ASSEMBLY

[75] Inventors: Robert J. Corsmeier, Cincinnati; James S. Kelm, Milford, both of Ohio

[73] Assignee: General Electric Company, Cincinnati, Ohio

[21] Appl. No.: 371,142

[22] Filed: Jun. 26, 1989

Related U.S. Application Data

[62] Division of Ser. No. 142,584, Jan. 11, 1988, Pat. No. 4,868,963.

[51] Int. Cl.$^5$ .............................................. B23P 11/00
[52] U.S. Cl. ........................................ 29/451; 29/888; 29/889.21; 403/335
[58] Field of Search .................. 29/450, 451, 156.8 R, 29/156.8 B; 403/335; 285/367, 364, 325, 421, 406; 415/137, 136, 135, 189; 416/220 R, 221

[56] References Cited

U.S. PATENT DOCUMENTS

| | | | |
|---|---|---|---|
| 2,917,276 | 12/1959 | Klompas et al. | 253/78 |
| 2,928,649 | 3/1960 | Lombard et al. | 253/39 |
| 2,945,290 | 7/1960 | Walsh | 29/156.8 R |
| 2,962,809 | 12/1960 | Short et al. | 29/445 |
| 2,980,396 | 4/1961 | Mousesian | 253/78 |
| 3,081,102 | 3/1963 | Murray et al. | |
| 3,694,882 | 10/1972 | Desmond | 29/156.8 R |
| 3,997,280 | 12/1976 | Germain | 415/189 |
| 4,083,648 | 4/1978 | Asplund | 415/189 |
| 4,255,086 | 3/1981 | Roberts | 29/156.8 R |
| 4,304,523 | 12/1981 | Cursmeier et al. | 416/221 |
| 4,530,437 | 7/1985 | Grey et al. | 29/451 |
| 4,710,037 | 12/1987 | Newberg | 29/451 |
| 4,807,335 | 2/1989 | Candea | 29/451 |
| 4,811,975 | 3/1989 | Paul, Jr. et al. | 29/451 |

Primary Examiner—Howard N. Goldberg
Assistant Examiner—Irene Cuda
Attorney, Agent, or Firm—Jerome C. Squillaro

[57] ABSTRACT

A mounting assembly for supporting stator vane platforms formed in an extended arc length, such as 90°, in a compressor casing, comprising a circumferential flange formed in the compressor casing having spaced clamp arms, a flange carried on each stator vane platform having a surface which is formed with a plurality of radially outwardly extending wedge lock elements, and locking springs having inner and outer sides each formed with wedge lock elements extending radially outwardly therefrom. In order to mount the stator vane platform on the compressor casing, the locking springs are placed in an "unlocked" position on the flange of a stator vane platform wherein the wedge lock elements on the inner side of the locking spring extend between adjacent wedge lock elements on the flange. The vane platform flange and locking spring are then inserted as a unit between the clamp arms of the compressor casing. The locking spring is then moved to a "locked" position wherein the wedge lock elements on the inner side of the locking spring engage the wedge lock elements on the flange of the vane platform, and the wedge lock elements on the outer side of the spring engage one of the clamp arms. In the locked position, the locking spring is wedged between the vane platform flange and one of the clamp arms, and applied a radially inwardly and outwardly directed force thereto which securely mounts the vane platform flange between the clamp arms of the compressor casing and reduces leakage of air therebetween.

12 Claims, 5 Drawing Sheets

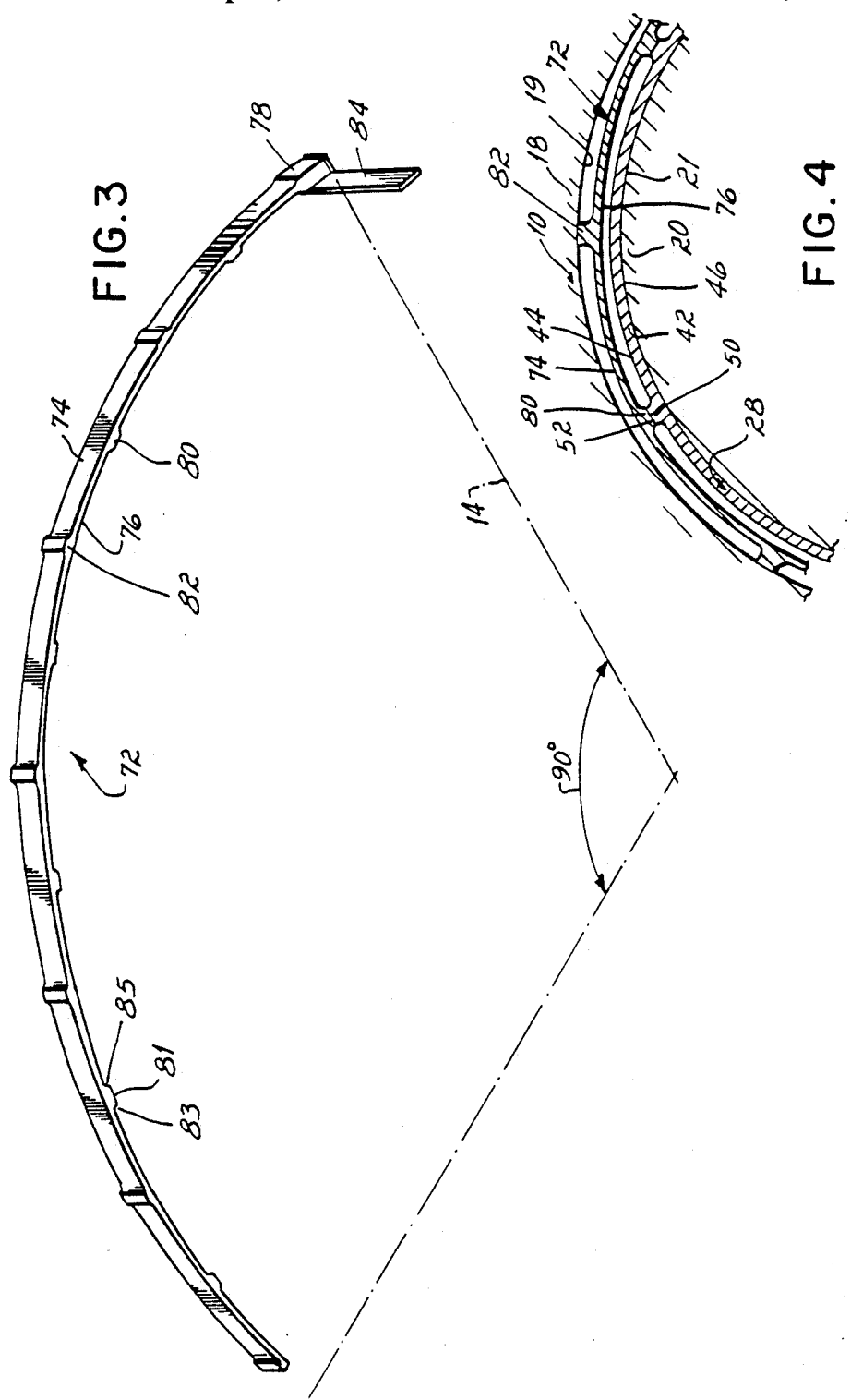

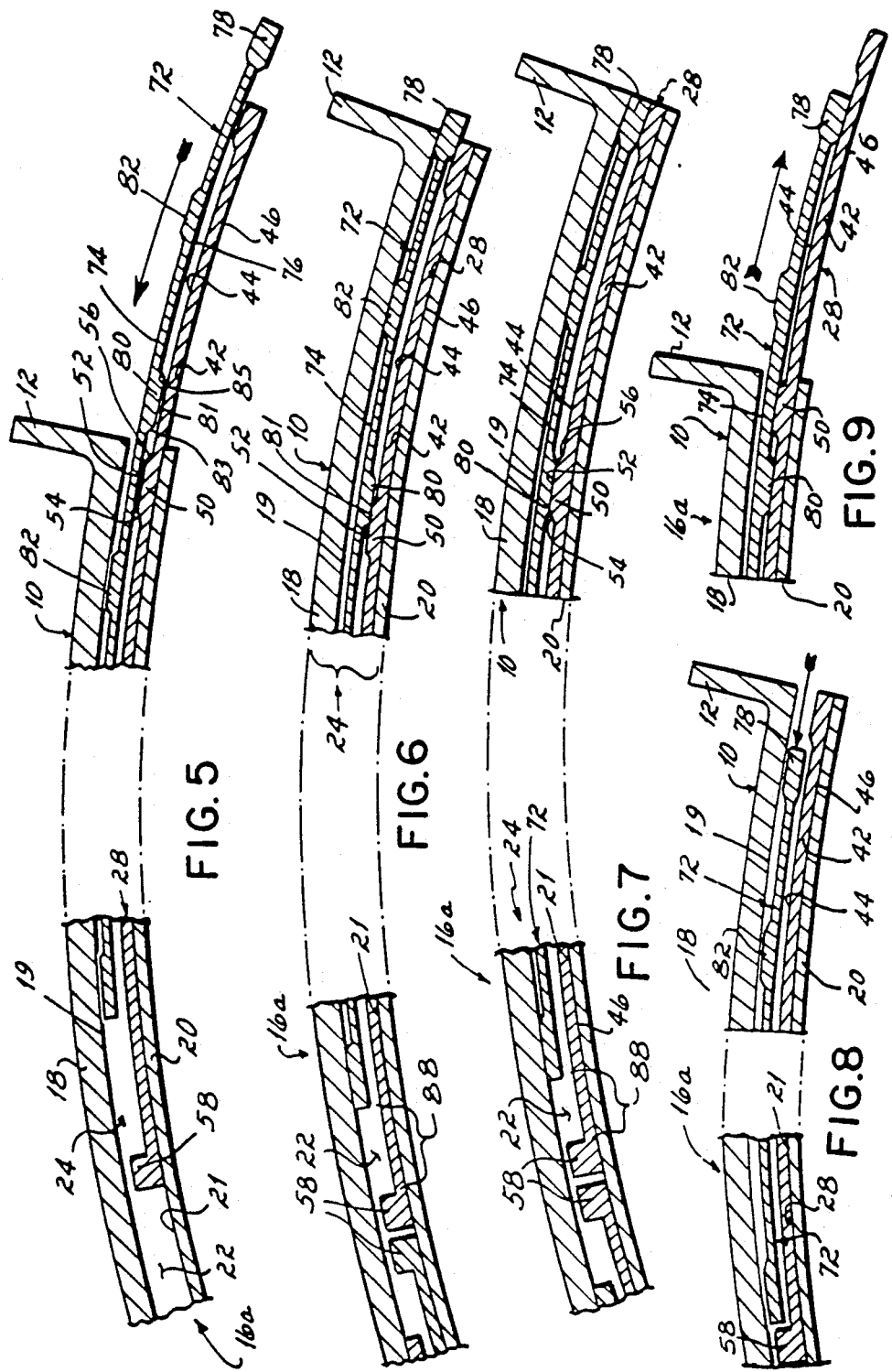

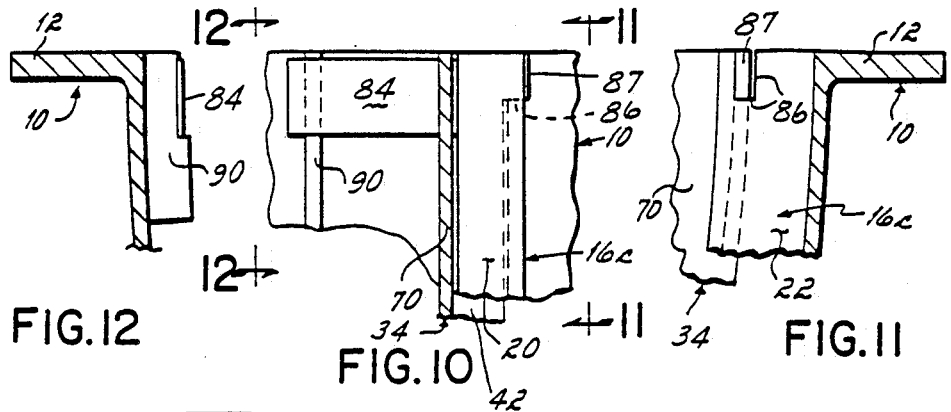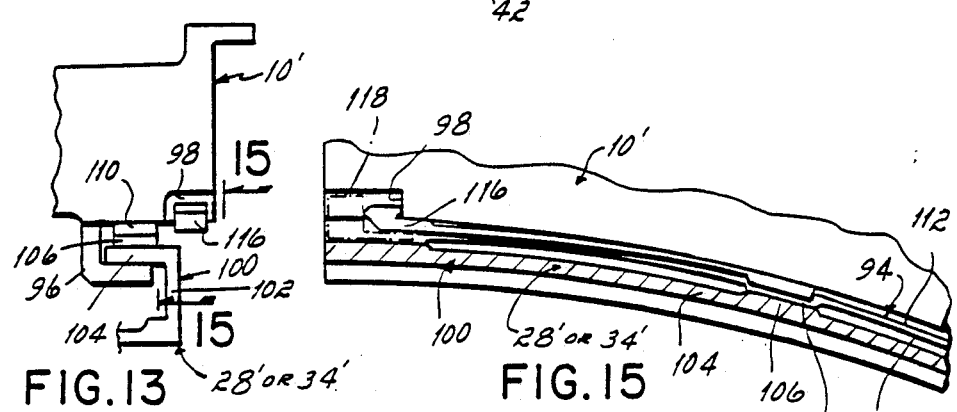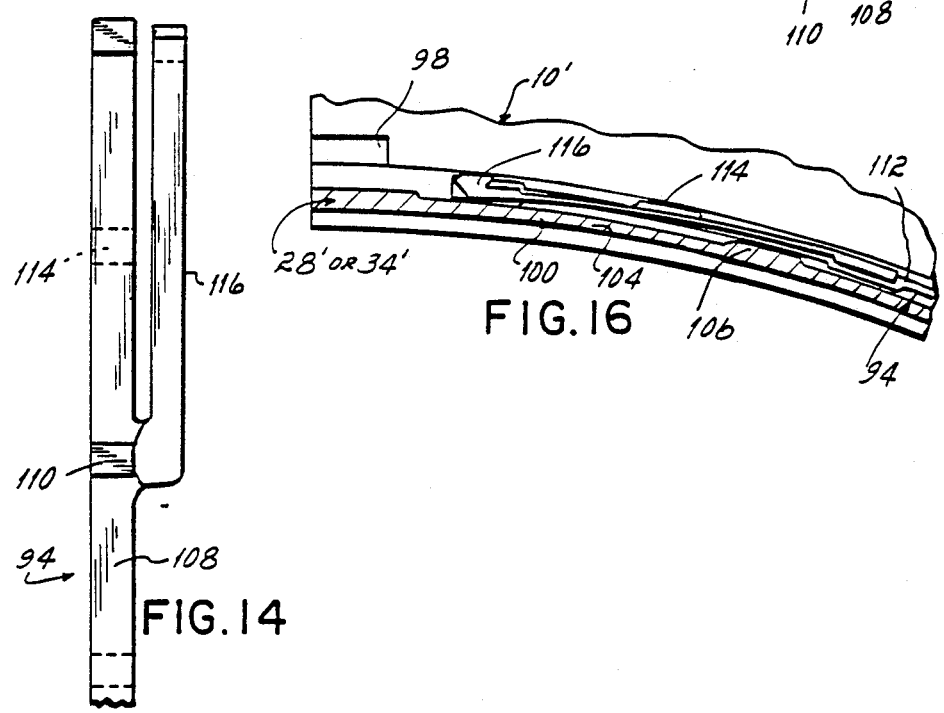

STATOR VANE MOUNTING METHOD AND ASSEMBLY

The government has rights in this invention pursuant to Contract No. F33657-83-C-0281 awarded by the Department of Air Force.

This is a division of application Ser. No. 142,584, filed Jan. 11, 1988, now U.S. Pat. No. 4,868,963.

FIELD OF THE INVENTION

This invention relates to mounting assemblies, and, more particularly, to a mounting structure for securing stator vane platforms to the casing of a compressor in a jet engine.

BACKGROUND OF THE INVENTION

The compressors of jet engines include a number of axially spaced banks or rows of fixed stator vanes which are positioned between rows of rotatable rotor blades. Each stator vane is mounted to a platform which is carried in a circumferential T-shaped slot, dovetail slot or similar structure formed in the compressor casing. In many compressors, each separate stator vane has its own platform and these stator vane platforms abut one another within each row around the circumference of the compressor.

In order to maximize efficiency, it is important to maintain the flow of air rearwardly or downstream through the compressor and limit backflow of air in the opposite, upstream direction. One area where an unwanted backflow of air has been produced is at the connection between the stator vane platforms and the compressor casing, particularly in the high pressure areas of the compressor. It has been found that a backflow of air develops between the stator vane platforms and the T-shaped or dovetail slots in the compressor casing within which they are mounted. Additionally, the abutting edges of adjacent stator vane platforms within each circumferential bank or row of stator vanes form a path along which high pressure air can leak and create a backflow in the upstream direction.

One approach in the prior art to overcome this backflow problem has been to increase the arc length of the stator vane platforms so that a number of stator vanes can be mounted to a single platform. This reduces the number of joints between abutting stator vane platforms within each row of stator vanes and thus lessens the leakage problem found in prior art compressors which employ a separate platform for each stator vane.

Although larger stator vane platforms reduce the backflow problem, several other problems are created. The tolerance between the dovetail or T-shaped slots in the compressor casing and the stator vane platforms must be kept to a minimum for two reasons. First, the backflow of air in an upstream direction along a path between the stator vane platforms and compressor casing must be limited to maximize the efficiency of the compressor. Secondly, the appropriate clearance must be maintained between the stator vane platforms and the tips of the rotor blades.

When the arc length of the stator vane platforms is increased, they become more susceptible to warpage, and, manufacturing tolerances also increase. This makes assembly of the larger stator vane platforms within the circumferential dovetail or T-shaped slots in the compressor casing a very difficult maintenance procedure. Assuming stator vane platforms having a large arc length can be forced into a slot in the compressor casing, their removal is even more difficult due to oxidation of the such surfaces during operation of the jet engine at high temperature.

On the other hand, if the dimensions of the T-shaped or dovetail slots in the compressor casing are increased to aid in assembly and disassembly, leakage of air in the upstream direction between the stator vane platforms and compressor casing increases. Additionally, the required spacing between the stator vane platforms and rotor blades cannot be maintained.

SUMMARY OF THE INVENTION

It is therefore among the objectives of this invention to provide apparatus for mounting stator vane platforms to the casing of a compressor in a jet engine which substantially reduces leakage of air between the stator vane platform and compressor casing, which accommodates warpage and manufacturing tolerances in the stator vane platforms and/or compressor casing and which permits easy installation and removal of the stator vane platforms.

These objectives are accomplished in a mounting assembly for supporting stator vane platforms formed in an extended arc length, such as 90° upon a compressor casing, comprising a circumferential flange formed in the compressor casing having spaced clamp arms, a flange carried on each stator vane platform having a surface which is formed with a plurality of radially outwardly extending wedge lock elements, and locking springs having inner and outer sides each formed with wedge lock elements extending radially outwardly therefrom. The mounting procedure begins by placing a locking spring in an "unlocked" position on the flange of a stator vane platform wherein the wedge lock elements on the inner side of the locking spring extend between adjacent wedge lock elements on the flange. With the locking spring in this unlocked position, the vane platform flange and locking spring are inserted as a unit between the clamp arms of the compressor casing which are spaced from one another to easily receive the vane platform flange and locking spring therebetween. The locking spring is then moved to a "locked" position wherein the wedge lock elements on the inner side of the locking spring engage the wedge lock elements on the flange of the vane platform, and the wedge lock elements on the outer side of the spring engage one of the clamp arms. In the locked position, the locking spring is wedged between the vane platform flange and one of the clamp arms, and applies a radially inwardly and outwardly directed force thereto which securely mounts the vane platform flange between the clamp arms of the compressor casing and reduces leakage of air therebetween.

An important aspect of this invention is predicated upon the concept of permitting easy insertion of the flange formed on the stator vane platform within the spaced clamp arms formed on the compressor casing. This is achieved by providing a substantial clearance between the flange on the stator vane platform and the spaced clamp arms of the compressor casing with the locking spring in an unlocked position, i.e., when the wedge lock elements of the locking spring are not in contact with the wedge lock elements on the stator vane platform flange. This clearance permits the flange of the stator vane platform to be easily inserted or removed from between the clamp arms even where the stator vane platform is formed in an extended arc length and/or when the surfaces of the compressor casing and stator vane platforms become oxidized from operation of the engine at high temperatures.

In the presently preferred embodiment, there are four stator vane platforms and four locking springs each extending along a 90° arc length. As a result, only four joints between adjacent stator vane platforms are formed around the circumference of the compressor casing. This reduces the number of joints along which a backflow of air can be developed, compared to prior art designs employing a separate platform for each stator vane.

Another important feature of this invention is that once the stator vane platforms are mounted to the compressor casing, they are quickly and easily locked together with a minimum of time and effort. One end of each locking spring extends circumferentially outwardly from the flange of the stator vane platform when they are inserted between the spaced arms of the compressor casing. In order to secure the flange of the stator vane platform to the compressor casing, the outwardly extending end of the locking spring is struck by a hammer or similar tool driving it inwardly to the locked position, described above, wherein the wedge lock elements on inner side of the locking spring engage the wedge lock elements on the facing surface of the flange of the stator vane platform.

By forming the stator vane platforms with a 90° arc length, the outer end of each locking spring is positioned at approximately the horizontal center line of the compressor which is easily accessible by maintenance personnel. This greatly simplifies the maintenance procedures for assembling and disassembling the stator vane platform from the compressor casing.

Disassembly of the stator vane platform is also accomplished with minimal time and effort. The locking spring is first driven further inwardly relative to the flange of the stator vane platform so that the wedge lock elements on the inner side of the locking spring move to the unlocked position, i.e., between adjacent wedge lock elements on the flange of the stator vane platform. This allows the stator vane platform and locking spring to be removed as a unit from between the spaced clamp arms of the compressor casing.

Additional structure is provided to aid in the assembly-disassembly procedure. In the presently preferred embodiment, a stop is formed on the compressor casing which engages a portion of the flange of the stator vane platform to ensure that the stator vane platform is inserted the proper distance into the compressor casing during assembly. Additionally, a stop is formed on the locking spring to control its inward movement relative to the stator vane platform and compressor casing. In one embodiment, the stop on the locking spring comprises a deflectable arm, extending generally parallel to the locking spring, which engages a recessed portion of the compressor casing to prevent the locking spring from being driven too far inwardly when it is moved to the locked position. In an alternative embodiment, the stop for the locking spring comprises an arm formed on the locking spring perpendicular thereto which engages an extension formed on the compressor casing so that the locking spring extends approximately flush with the compressor casing when driven into the locked position.

In order to disassemble the stator vane platform from the compressor casing, the arm forming the stop of the locking spring is first deflected out of engagement with the compressor casing and then the locking spring is driven inwardly to an unlocked position as described above.

DESCRIPTION OF THE DRAWINGS

The structure, operation and advantages of the presently preferred embodiment of this invention will become further apparent upon reference to the following description taken in conjunction with the accompanying drawings, wherein:

FIG. 3 is an isometric view of one embodiment of the locking spring herein;

FIG. 4 is a schematic cross sectional view of a portion of the locking spring, exaggerated to illustrate the deflection of the spring;

FIGS. 5-9 are fragmentary cross sectional views of the compressor casing, locking spring and vane platform flange showing the locking sequence including movement of the locking spring to a locked position as shown in FIGS. 5-7, and then to an unlocked position as shown in FIGS. 8 and 9;

FIG. 10 is an enlarged view of the end of the stator vane platform flange where it abuts the compressor casing, taken generally along line 10—10 of FIG. 1;

FIG. 11 is a view taken generally along line 11—11 of FIG. 10;

FIG. 12 is a view taken generally along line 12—12 of FIG. 10;

FIG. 13 is a perspective view of an alternative embodiment of the flanges for the compressor casing and stator vane platform, and the locking spring herein;

FIG. 14 is a partial plan view of the locking spring shown in FIG. 13;

FIG. 15 is a cross sectional view, taken on line 15—15 of FIG. 14, illustrating the locking spring shown of FIG. 14 in the locked position; and FIG. 16 is a cross sectional view similar to FIG. 15 illustrating the locking spring in an unlocked position.

DETAILED DESCRIPTION OF THE INVENTION

Figure 1:
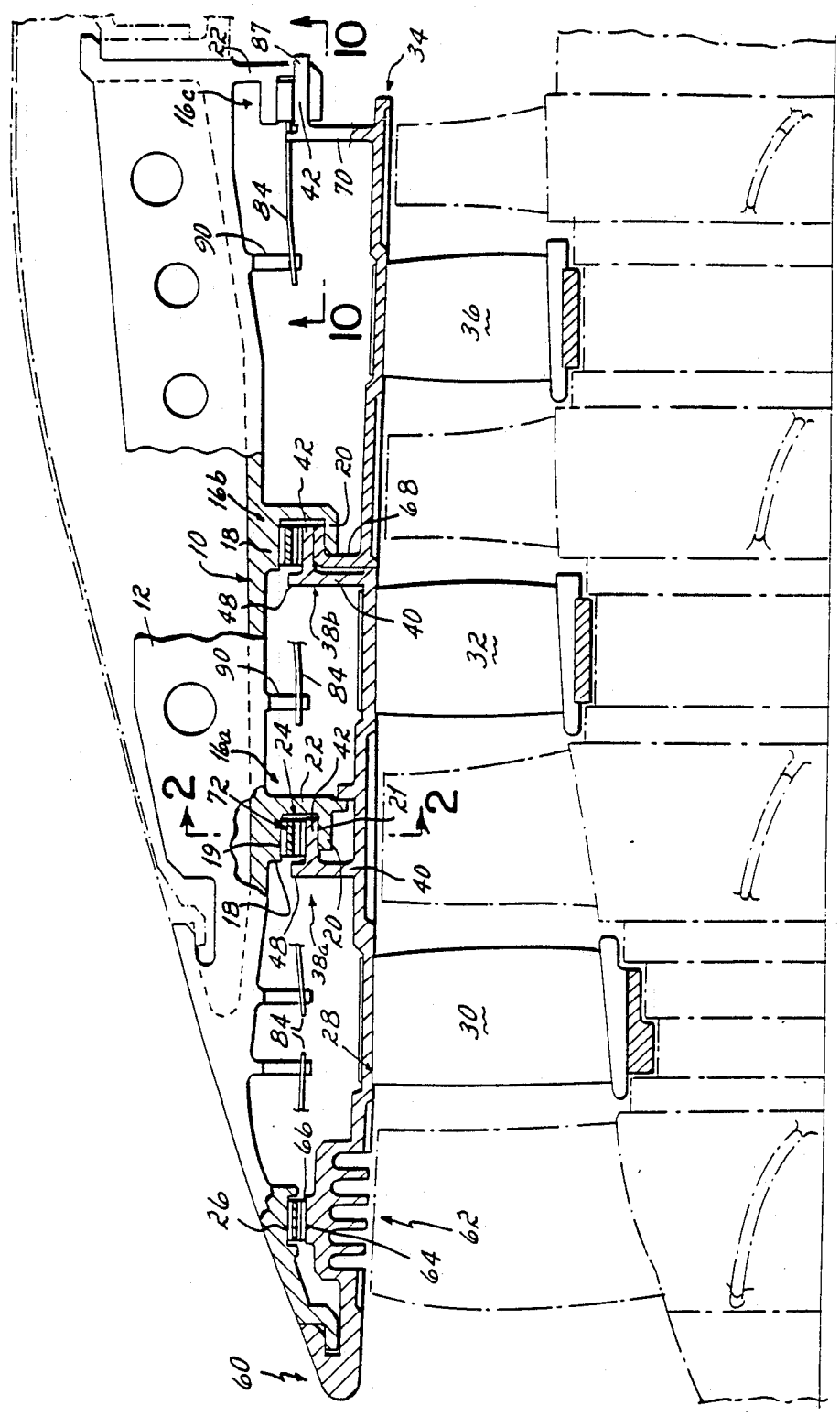
FIG. 1 is an elevational view in partial cross section of a portion of the compressor casing, the forward and aft stator vane platforms and rotor blades of the compressor of a jet engine.
Figure 2:
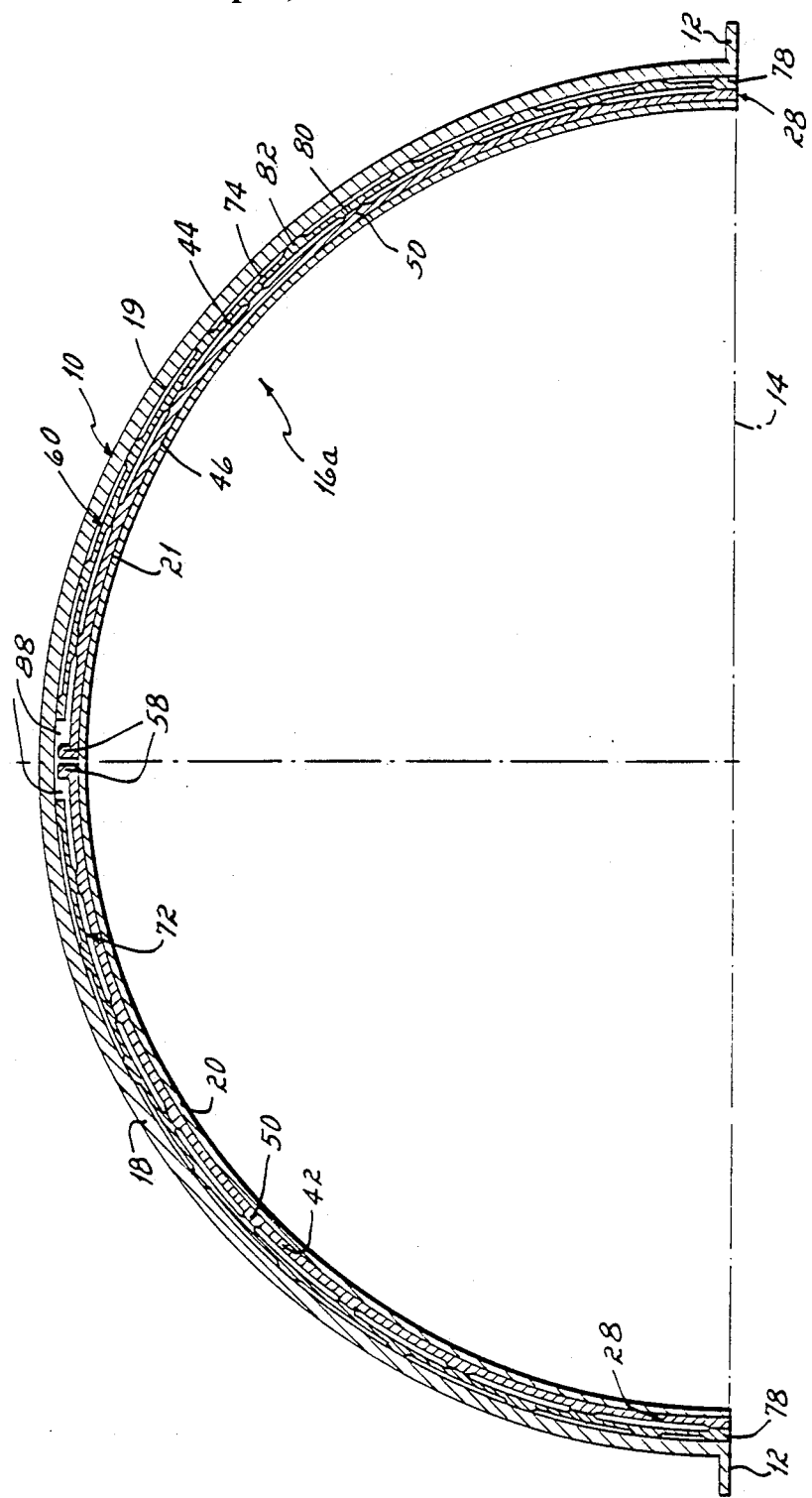
FIG. 2 is an assembled, cross sectional view of the top half of the compressor casing, forward stator vane platform flange and two locking springs taken generally along line 2—2 of FIG. 1.

Referring now to FIGS. 1 and 2, a portion of the compressor of a jet engine is illustrated. The compressor includes a generally cylindrical-shaped compressor casing 10 formed in two semi-circular half sections, the upper one of which is illustrated in FIG. 2. The upper and lower half sections of the compressor casing 10 are connected along an axially extending flange 12 (FIG. 2) which is co-linear with the horizontal center line 14 of the compressor casing 10.

In the embodiment illustrated in FIGS. 1-12, the compressor casing 10 is formed with three circumferentially extending flanges 16a, 16b, and 16c, each of which comprises a pair of radially spaced, circumferentially extending clamp arms 18, 20 connected by a leg 22 so as to form a C-shaped channel 24 between the clamp arms 18, 20 and the leg 22. Each of the clamp arms 18, 20 is formed with an inner surface 19, 21, respectively, which face one another. The forward end of the compressor casing 10, i.e., at the lefthand portion of FIG. 1, is formed with a recess 26 for purposes to become apparent below.

In the illustrated embodiment, the circumferential flanges 16a and 16b, support a forward vane platform 28 and two rows of stator vanes 30, 32 carried by the forward vane platform 28. The compressor casing flanges 16b, c support an aft vane platform 34 which carries a third row of stator vane 36. There are a total of four forward vane platforms 28 and four aft vane platforms 34, each of which extend 90° around the circumferential flanges 16a–c of the compressor casing 10.

For purposes of illustration, only two of the forward vane platforms 28 on the upper portion of the compressor casing 10, above the horizontal center line 14, are shown in FIG. 2. It should be understood that there are two additional forward vane platforms 28 on the lower half of the compressor casing 10 and a total of four aft vane platforms 34 supported upon the compressor casing 10 in the manner discussed below. Additionally, each forward vane platform 28 mounts a plurality of stator vanes 30, 32. The stator vanes 30, 32 of all four platforms 28 combine to form two spaced rows extending about the entire circumference of the compressor casing 10. Similarly, a separate row of stator vanes 36 extends about the circumference of compressor casing 10 supported by the four aft vane platforms 34.

Referring now to FIGS. 1, 2 and 5-9, the forward vane platform 28 is formed with a pair of longitudinally spaced flanges 38a and 38b, each of which is generally T-shaped in cross section and comprises a vertical leg 40 connected to a horizontal leg 42. The horizontal leg 42 has an outer surface 44 and an inner surface 46. The vertical leg 40 of each flange 38a and 38b extends slightly beyond the point of connection with horizontal leg 42 forming a stop 48.

The outer surface 44 of the horizontal leg 42 of each flange 38a and 38b is formed with a plurality of spaced wedge lock elements 50 therealong. Each wedge lock element 50 extends radially outwardly from the horizontal leg 42 of flanges 38a and 38b forming an arcuate outer surface 52 connected to angled or tapered ends 54, 56. Additionally, one end of the horizontal leg 42 of flanges 38a and 38b is formed with an upright projection 58.

As viewed in FIG. 1, the forward end 60 of the forward vane platform 28 is formed with mounting structure 62 having a planar outer surface 64 to which a plurality of wedge lock elements 66 are mounted. The wedge lock elements 66 are identical to wedge lock elements 50 on the flanges 38a and 38b, the purpose of which is discussed in detail below.

The aft vane platform 34 is formed with an L-shaped flange 68 at its forward end and a second flange 70 at its rearward end. The second flange 70 is substantially identical to the flanges 38a and 38b of the forward vane platform 28, and the same reference numbers are used to identify structure on second flange 70 which corresponds to that of flanges 38a and 38b.

Referring now to FIG. 3, one presently preferred embodiment of a locking spring 72 is illustrated. The locking spring 72 comprises an arc length of spring steel or similar material slightly less than 90° having an outer surface 74, an inner surface 76 and an enlarged end 78. The inner surface 76 of the locking spring 72 is formed with a plurality of spaced wedge lock elements 80, each having an arcuate outer surface 81 connected to angled or tapered ends 83, 85. The wedge lock elements 80 on locking spring 72 are adapted to mate with the wedge lock elements 50 on the flanges 38a and 38b of the forward vane platform 28 (see FIG. 1), the wedge lock elements 66 formed on outer surface 64 of the forward vane platform 28 and the wedge lock elements (not shown) formed on the flange 70 of the aft vane platform 34.

Referring again to FIG. 3, the outside surface 74 of locking spring 72 is also formed with wedge lock elements 82 which are identical to wedge lock elements 80. The wedge lock elements 82 are staggered relative to the wedge lock elements 80 so that each wedge lock element 82 on the outer surface 4 of locking spring 72 is spaced between adjacent wedge lock elements 80 on the inner surface 76 of locking spring 72. A spring arm 84 is mounted to the end of locking spring 72 at its enlarged end 78 for purposes to become apparent below.

Referring now to FIGS. 5-9, the sequence is illustrated for inserting and locking the forward vane platform 28 into the circumferential flange 16a of compressor casing 10. It should be understood that the same procedure is followed in securing the forward vane platform 28 to flange 16b and mounting structure 2, and in securing the aft vane platform 34 to the flange 16c.

Initially, the locking spring 72 is placed onto the outer surface 44 of the horizontal leg 42 of flange 38a. The locking spring 72 is positioned in an "unlocked" position thereon wherein the wedge lock elements 80 on the inner surface 76 of locking spring 72 extend between adjacent wedge lock elements 50 on the flange 38a. In this position, the forward vane platform 28 and locking spring 72 are easily slid as a unit into the C-shaped channel 24 formed between the clamp arms 18 and 20 of the flange 16a in compressor casing 10. As shown in FIG. 2, both the forward vane platform 28 and locking spring 72 extend through a 90° arc length so that 90° of the circumference of the compressor casing 10 is accommodated by a single forward vane platform 28.

As shown in FIG. 1 the forward vane platform 28 and locking spring 72 are inserted circumferentially within the compressor casing flange 16a until a stop 87 on the horizontal leg 42 of flange 38a of forward vane platform 28 engages a seat 86 formed on the leg 22 between the spaced clamp arms 18 and 20 of flange 16a. See also FIGS. 10-12. This prevents further inward, circumferential movement of the forward vane platform 28 with respect to the compressor casing 10 to ensure that the forward vane platform 28 is flush with compressor casing flange 12.

With the forward vane platform 28 in this position, a portion of the locking spring 72 extends outwardly from the compressor casing flange 12 so that its enlarged end 78 is exposed. See FIG. 6. A hammer or other tool is then used to hit the enlarged end 78 to drive the locking spring 72 circumferentially inwardly relative to the flange 38a and the clamp arms 18 and 20 of flange 16a so that the enlarged end 78 of locking spring 72 is flush with the compressor casing flange 12. See FIG. 7.

As shown in FIGS. 1 and 10-12, the locking spring 72 is prevented from being driven too far inwardly relative to the casing flange 12 by the engagement of its spring arm 84 with an extension 90 formed in the compressor casing 10. In addition, the stop 48 formed on the vertical leg 40 of flange 38a prevents the locking spring 72 from moving laterally outwardly between the clamp arms 18 and 20.

As best shown in FIGS. 5, 6 and 7, in the course of being driven inwardly, the locking spring 72 moves to a "locked" position in which the wedge lock elements 80 on its inner surface 76 first ride upwardly along the angled edge 56 of each wedge lock element 50 formed on the horizontal leg 42 of flange 38a. The angled edge 56 acts like a ramp in permitting sliding movement of the wedge lock elements 80 therealong. The wedge lock elements 80 on the inner surface 76 of locking spring 72 then move to a seated, locked position in which the arcuate outer surface 81 of wedge lock elements 80 engage the mating, arcuate outer surface 52 of the wedge lock elements 50 on flange 38a of forward vane platform 28. In turn, the wedge lock elements 82 on the outer surface 74 of locking spring 72 are forced radially outwardly into engagement with the facing, inner surface 19 of clamp arm 18. As illustrated in FIG. 7, the locking spring 72 becomes tightly wedged between the clamp arm 18 and horizontal leg 42 of flange 38a of forward vane platform 28. The locking spring 72 deflects to some degree between adjacent wedge lock elements 80, as shown diagrammatically in FIG. 4, where the wedge lock elements 82 on the outer surface 74 of locking spring 72 contact the facing clamp arm 18.

As a result of the movement of locking spring 72 to a locked position, and its slight deflection between adjacent wedge lock elements 80, a substantial radial force is applied by the locking spring 72 to the clamp arm 18 and to the flange 38a of forward vane platform 28. In turn, the flange 38a is forced against the other clamp arm 20 of the flange 16a of compressor casing 10 so that the vane platform flange 38a is tightly wedged and clamped between the opposed clamp arms 18, 20. This securely mounts the forward vane platform 28 to the compressor casing 10.

Referring now to FIGS. 8 and 9, the steps are shown for moving the locking spring 72 to an unlocked position in order to remove the forward vane platform 28 from the compressor casing 10. Initially, the spring arm 84 of locking spring 72 is deflected downwardly as viewed in FIG. 1 to clear the bottom end of the extension 90 on compressor casing 10. A rod or similar tool is then placed on the enlarged end 78 of locking spring 72 and is struck by a hammer or the like to drive the locking spring 72 inwardly so that its wedge lock elements 80 move in between adjacent wedge lock elements 50 on the horizontal leg 42 of flange 38a. As shown in FIGS. 5-7, a space 88 is provided between the inner end of locking spring 72 and the projection 58 on the flange 38a to permit such inward movement of the locking spring 72. The forward vane platform 28 and locking spring 72 are then removed as a unit in the direction of the arrow in FIG. 9, with the projection 58 contacting the inner end of the locking spring 72 to ensure that it is pulled circumferentially outwardly from the flange 16a of compressor casing 10.

The same procedure described above in connection with locking the forward vane platform 28 at the flange 38a and compressor casing flange 16a is employed in securing the aft vane platform 34 and the forward end of the forward vane platform 28 at the mounting structure 62. A slight variation is present at the flange 16b of compressor casing 10 wherein both the flange 38b of forward vane platform 28 and the L-shaped flange 68 of the aft vane platform 34 are mounted within the same flange 16b of the compressor casing 10. As shown in FIG. 1, the L-shaped flange 68 contacts the clamp arm 20 of flange 16b while the flange 38b of forward vane platform 28 rests atop the L-shaped flange 68. The locking spring 72 is wedged between the flange 38b and clamp arm 18, with the L-shaped flange 68 being secured between the flange 8b and clamp arm 20. Otherwise, the structure and sequence for securing the forward vane platform 28 and aft vane platform 34 is identical to that described above.

Referring now to FIGS. 13-16, a slightly modified compressor casing 10' and vane platforms 28' or 34' are provided to accommodate an alternative locking spring 94. In this embodiment, the compressor casing 10 is formed with an L-shaped flange 96 and a seat 98 spaced from the flange 96. The vane platform 28 or 34 is formed with an L-shaped flange 100 having a vertical leg 102 connected to a horizontal leg 104, a portion of which overlies the flange 96 of compressor casing 10. The upper surface of the horizontal leg 104 of flange 100 is formed with spaced, wedge lock elements 106 of the type formed on flanges 38a and 38b as described above.

The locking spring 94 includes an inner surface 108 formed with a plurality of wedge lock elements 110 which mate with the wedge lock elements 106 on the flange 100. The outer surface 112 of locking spring 94 is formed with spaced wedge lock elements 114 which are staggered relative to the wedge lock elements 110 on its inner surface 108 in the same manner as locking spring 72 described above. A laterally extending arm 116 is mounted at one end of the locking spring 94 which is offset from the plane of locking spring 94 as shown in FIGS. 13 and 14.

In order to interconnect the compressor casing flange 96 and the vane platform flange 100, the identical procedure is followed as described in reference to the discussion of FIGS. 5-9. The only difference is that the lateral arm 116 of locking spring 94 engages the seat 98 formed in the compressor casing 10 to prevent the locking spring 94 from extending too far into the compressor casing 10, and to ensure that the wedge lock elements 110 on the locking spring 94 mate with the wedge lock elements 106 on the vane platform flange 100. Preferably, an L-shaped insert 118 is placed under the inner end of the lateral arm 116 to prevent it from moving inwardly and thus disengaging the seat 98 formed in compressor casing 10.

In order to move the locking spring 94 to an unlocked position, first remove the L-shaped insert 118 and then deflect the lateral arm 116 downwardly to disengage the seat 98 in the compressor casing 10. The locking spring 94 is then struck by a rod or the like to move it to an unlocked position in the identical manner as described above in connection with locking spring 72.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the locking structure of this invention has been illustrated in the context of securing stator vane platforms to the compressor casing in a jet engine. It is contemplated, however, that the locking springs 72 or 94 could be adapted to secure the flanges of other structural members as desired. Additionally, the particular configuration of the forward vane platform and aft vane platform is shown in the Figs. for purposes of illustration only, it being understood that such platforms could mount additional circumferential rows of stator vanes, some or all of which could be adjustable instead of fixed as shown in the Figs. Furthermore, the locking springs 72 or 94 and stator vane platforms 28 or 30 need not extend through a 90° arc length, but could be formed in a variety of different arc lengths depending upon the requirements of a given application.

Therefore, it is intended that the invention not be limited to the particular embodiment disclosed as the best mode contemplated for carrying out this invention, but that the invention will include all embodiments falling within the scope of the appended claims.

We claim:

1. The method of mounting a first element to a second element, comprising:
   providing spaced, first and second clamping surfaces on the first element;
   providing a flange on the second element, said flange being formed with first wedge lock elements extending outwardly from a surface thereof;
   positioning a locking spring having outwardly extending second wedge lock elements upon said surface of said flange so that said second wedge lock elements on said locking spring extend between adjacent first wedge lock elements on said flange;
   inserting both said locking spring and said flange between said spaced first and second clamping surfaces;
   moving said locking spring relative to said flange so that said first wedge lock elements on said flange engage said second wedge lock elements on said locking spring and thereby force said locking spring against said flange and one of said first and second clamping surfaces, said locking spring and said flange being tightly wedged between said first and second clamping surfaces for connecting the first element to the second element.

2. The method of claim 1 in which said step of moving said locking spring relative to said flange comprises moving third wedge lock elements formed on a side of said locking spring opposite said second wedge lock elements against one of said first and second clamping surfaces.

3. Apparatus for connecting a first element to a second element, comprising:
   first and second clamp arms formed on said first element, said first clamp arm having an outer surface and said second clamp arm having an inner surface spaced from said outer surface of said first clamp arm;
   a flange formed on said second element, said flange having an inner surface and an outer surface, said flange being inserted between said spaced clamp arms so that said inner surface of said flange faces said outer surface of said first clamp arm and said outer surface of said flange faces said inner surface of said second clamp arm;
   first wedge lock elements formed on one of said outer surface of said flange and said inner surface of said second clamp arm and extending radially outwardly therefrom;
   a locking spring inserted between said outer surface of said flange and said inner surface of said second clamp arm, said locking spring being formed with second wedge lock elements extending radially outwardly therefrom, said second wedge lock elements being matable with said first wedge lock elements;
   said spring being movable relative to said clamp arms and said flange to a locked position wherein said second wedge lock elements on said locking spring engage said first wedge lock elements formed on one of said flange and said second clamp arm thereby forcing said locking spring against said flange and second clamp arm, said locking spring and said flange being wedged tightly between said first and second clamp arms to connect the first and second elements together.

4. The apparatus of claim 3 in which said spaced clamp arms are connected by a leg member forming a C-shaped channel which receives said flange formed on the second element.

5. The apparatus of claim 3 in which said first wedge lock elements are formed on said outer surface of said flange, said first wedge lock elements each having an arcuate outer surface, and angled ends extending between said outer surface of said flange and said arcuate outer surface.

6. The apparatus of claim 5 in which said locking spring is formed with an inner side and an outer side, said second wedge lock elements being formed on said inner side of said spring, said second wedge lock elements each having an arcuate outer surface which mates with said arcuate outer surface of said first wedge lock elements;
   said outer side of said spring being formed with a plurality of third wedge lock elements, each of said third wedge lock elements being positioned between adjacent second wedge lock elements on said inner side of said locking spring, said third wedge lock elements being forced into contact with said inner surface of said second clamp arm when said first wedge lock elements of said flange engage said second wedge lock elements of said spring.

7. The apparatus of claim 3 in which said first and second clamp arms, said flange and said locking spring are all arcuate in shape.

8. The apparatus of claim 3 in which said locking spring is formed with an enlarged end adapted to be struck with a hammer.

9. The apparatus of claim 3 in which one end of said flange is formed with a projection engageable with said locking spring to facilitate removal of said locking spring from between said first and second clamp arms.

10. The apparatus of claim 3 in which said flange is formed with a stop to laterally retain said spring between said clamp arms.

11. Apparatus for connecting a first element to a second element, comprising:
    first and second clamping surfaces formed on said first element, said first and second clamping surfaces being spaced from one another;
    a flange formed on said second element, said flange being inserted between said first and second clamping surfaces;
    a locking spring inserted between said flange and said first clamping surface;
    first wedge lock elements formed on said locking spring and extending outwardly therefrom, and mating second wedge lock elements formed on one of said flange and said first clamping surface and extending outwardly therefrom;

said locking spring being movable relative to said flange and said first clamping surface to a locked position in which said first wedge lock elements engage said mating second wedge lock elements and force said locking spring against said flange and said first clamping surface, said locking spring and said flange being tightly wedged between said first and second clamping surfaces for connecting the first element to the second element.

12. Apparatus for connecting a first element to a second element, comprising:
first and second arcuate clamping surfaces formed on said first element, said first and second arcuate clamping surfaces being spaced from one another;
an arcuate flange formed on said second element, said arcuate flange being inserted between said first and second arcuate clamping surfaces;
an arcuate locking spring inserted between said arcuate flange and said first arcuate clamping surface;
first wedge lock elements formed on said arcuate locking spring and extending radially outwardly therefrom, and mating second wedge lock elements formed on one of said arcuate locking spring and said first arcuate clamping surface and extending radially outwardly therefrom;
said arcuate locking spring being movable relative to said arcuate flange and said arcuate first clamping surface to a locked position in which said first wedge lock elements contact said mating second wedge lock elements and force said arcuate locking spring radially outwardly against said arcuate flange and said arcuate first clamping surface, said arcuate locking spring and said arcuate flange being tightly wedged between said first and second arcuate clamping surfaces for clamping the first element to the second element.

* * * * *